April 24, 1934.    H. B. INGLIS    1,955,746
LEVEL INDICATOR
Filed Aug. 13, 1928    3 Sheets-Sheet 1

H. B. Inglis
INVENTOR

April 24, 1934.  H. B. INGLIS  1,955,746
LEVEL INDICATOR
Filed Aug. 13, 1928  3 Sheets-Sheet 2

H. B. Inglis
INVENTOR

April 24, 1934.                H. B. INGLIS                1,955,746
                              LEVEL INDICATOR
                          Filed Aug. 13, 1928           3 Sheets-Sheet 3

H. B. Inglis
INVENTOR

Patented Apr. 24, 1934

1,955,746

UNITED STATES PATENT OFFICE 1,955,746

LEVEL INDICATOR

Henry B. Inglis, Dayton, Ohio

Application August 13, 1928, Serial No. 299,384

23 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

My invention relates in general to the class of level indicators, such as the common spirit level, pendulum devices, etc., but constitutes more specifically means by which, with or without indication of level, a gyroscopic device can be set into operation automatically in correspondence with the occurrence of a level position, and for detecting the occurrence of level position apart from accelerations which render the ordinary indicators of leveling inaccurate.

The particular useful application, in which I will describe my device, is in automatically uncaging a gyroscope as used in the stabilization of a sight reference for accurate dropping of bombs from moving aircraft, in which application it is vital to accuracy that the gyroscope be located at the instant of releasing, in a predetermined position corresponding in this particular application to a leveling of the case in which the gyroscope is caged, and in which operation large errors of leveling have heretofore been involved. There are other useful applications of the device as for similarly insuring that a camera is leveled at the time of taking photographs, or, for recording in connection with a photograph taken out of level, the inclination at which the photograph is taken.

Figure 1:
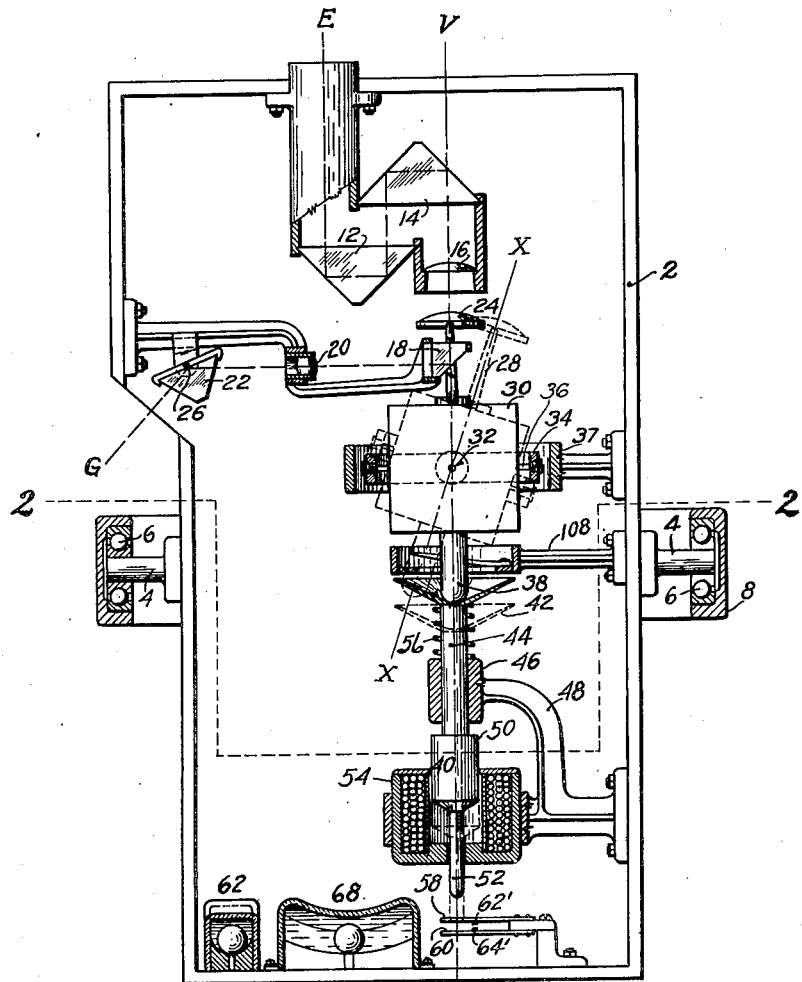
Figure 1 is a cross sectional view of the elements of a bomb sight in which the level detector device is applied.

Heretofore, neither the pilot nor the bomber could tell whether the aircraft and the bomb sight were strictly level or not, upon uncaging the gyroscope, nor could the bomber tell by looking through the reticle whether the gyroscope has been released at vertical or several degrees off because the gyroscope has a very long period of precession into vertical. The slow precession of the reticle is not visible nor can true vertical position be sensed within 5 degrees or more. Hence, bombing errors have been enormous from this source and results depend upon measurements with respect to the true vertical in an aircraft which is constantly rolling and pitching. By the use of an ordinary spirit level mounted either upon the gyroscope support or on the craft fuselage, to which the support is attached, the large error of such a level indicator gave no accurate indication of when the gyroscope was in correct position for release and the process of uncaging the gyroscope in a supposed vertical position as the first preliminary to the use of the sight, was largely a matter of guesswork.

My device contemplates not only automatic uncaging of the gyroscope corresponding to correct position of the sighting reference stabilized by it, but also, if desired, accurate visible indication of such a position for manual release of the gyroscope.

Similar reference characters designate similar parts throughout the several views of the drawings, wherein 2 designates a bomb sight case pivotally supported on trunnions 4 in bearings 6 formed on a gimbal ring 8 which in turn is supported by trunnions 10 in bearings 12 fixed to a part of the airplane fuselage (not shown). The axis of the trunnions 4 is at right angles to the axis of the trunnions 10. The bomb sight case 2 encloses an optical system sight line E—G, through prisms 12, 14, 18 and 22 and lenses 16 and 20 and, through a reticle 24 which forms the stabilized sighting reference. All parts of this optical system are fixed to the case 2 except prism 22 which is movable about a pivot 26 and reticle 24 carried by arm 28, on gyroscope case 30. The latter is movable in field of view in any direction about the point 32 with the gyroscope which is universally suspended on so-called "three axes of freedom", intersecting at 32. Such suspension is represented by gimbal ring 34 in which the gyroscope case 30 is pivoted on axis 36, this gimbal ring being in turn pivoted on axis through 32 at right angles to the axis 36 in bearings in a support 37 which is attached to the case.

It is not necessary to an understanding of the use of my device to describe the particular optical system of a bomb sight as illustrated in Fig. 1, nor the method of gyroscopic stabilization of the reticle 24 except to say that the maintenance of the gyroscope axis X—X in vertical, in spite of oscillations of the case 2, and the optical parts in fixture with it, constitutes accurate stabilization of the sighting reference and that it is a characteristic of gyroscopes that the rotor (not shown), which is revolving within the case 30 on axis X—X, tends to hold the plane of its rotation and hence to maintain the gyroscopic axis X—X in whatever position it may be when the gyroscope pin 38 is released. In such application of gyroscopic stabilization, the gyroscope should be slightly pendulous in order that the axis X—X may seek the vertical; on the other hand in order to render the effects of acceleration small, which causes precession of the axis X—X, a very long period of recovery to vertical is necessary; hence it is vital to the practical use of such stabilization that the axis X—X be substantially vertical when the gyroscope is initially released from the case 2 and my device insures that the gyroscope is automatically released when its axis X—X is substantially vertical.

Projecting downwardly from the gyroscope case 30 is a pin 38 which passes centrally through a bumper contacting device hereinafter described. Positioned directly below the pin 38 is a plunger 40 comprising an inverted cone shaped member 42; this cone member is integral with a shaft 44 that is slidable in a bearing 46 on the bracket 48 fixed to the casing 2 by means of bolts or the like. The shaft 44 is provided at its lower end with a solenoid plunger 50 which is provided with an extension 52 that passes through a solenoid 54. The plunger 40 is normally urged upward by means of a coil spring 56 surrounding the shaft 44 between the cone 42 and bearing 46 to lock the gyroscope whereas the solenoid 54 when energized pulls the plunger cone against spring 21 and frees the gyroscope, so that the apparatus in which it is pivotally suspended may tilt without tilting axis X—X.

Fixed to the bottom of the case 2 is a Z-shaped bracket upon which are mounted two spaced contact springs 58, 60 provided with electrical contacts 62', 64'. These contacts are positioned in the path of the plunger extension 52 and are forced into contact in the downward or uncaging stroke of the plunger.

Figure 4:
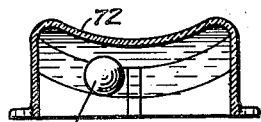
Figure 4 is a section of a level detector unit through 4—4 of Figure 3.
Figure 5:
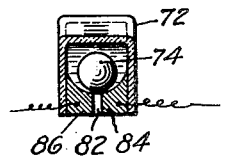
Figure 5 is a section of one level detector unit through 5—5 of Figure 3.
Figure 3:
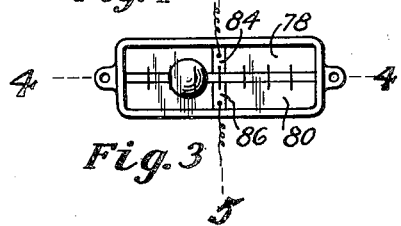
Figure 3 is a top view of one of the level detector units.
Figure 2:
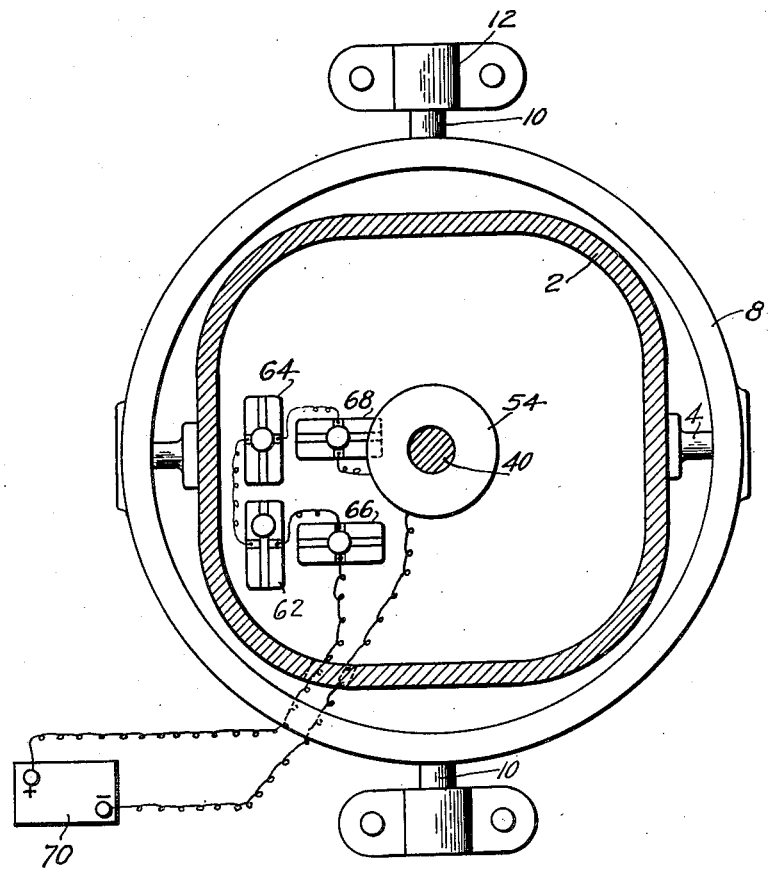
Figure 2 is a top view section along 2—2 of Figure 1, showing installation and electrical connection of the series of units of the level detector and showing gimbal ring suspension of the bomb sight.

Mounted on the bottom of causing 2 are two pair of detector units 62, 64 and 66, 68 which are electrically connected, the electrical connections being best shown in Fig. 2. Units 62 and 64 are parallelly arranged and at right angles to the aligned units 66 and 68 and all are electrically connected in series with the unlocking solenoid 54 and with the battery source of current 70. It will be understood that the detector units could be mounted, or any part fixed relative to the case, such as on top of the gyroscope 30 which is fixed with relation to the case when locked. Each of these units of the level detector series are similar in construction and the component parts of one of these units is best shown in Figs. 3, 4, and 5 in which 72 is a case enclosing a metallic ball 74 rolling in a concave race 76 built up of two symmetrical halves 78 and 80 made of insulating material, and which are shown spaced to provide a sump 82 to receive any sediment which might otherwise collect in the ball track, and in which two oppositely opposed electrical contacts 84, 86 are embedded at the center corresponding to the normal position of the ball when the unit is level, and forming a part of the continuous race.

While the several level units are similar in construction, the units whose races are parallel so as to be acted upon by a force with respect to the same direction such as 66 and 68, are preferably arranged parallel to the longitudinal axis of the craft, and contain damping liquids of different viscosity so that the ball in one unit meets with a resistance to its motion through the damping liquid, different from that which the ball in a parallel race meets for the same tilt, acceleration or combination. Hence, the time of deflection from a given position at rest, back to normal position at the center of the race, is different in any two parallel units, so that one ball lags behind the other, and there is a certain time lag before both will come to rest at centers corresponding to no tilt and no acceleration.

The combination of two or more level units, in which the elements, deflecting in the same plane, are differently damped so as to cause non-synchronous deflections for tilt, acceleration, or both, provides indication of level or out of level position according as the several elements are simultaneously at centers or not, since simultaneous centering of all deflecting elements does not occur if in common they are tilted or acted upon by an acceleration, or both. Hence, the well known error, which acceleration introduces in the indication of level by the ordinary spirit or ball level, is eliminated, and the simultaneous centering of all deflecting elements when in a level position when acceleration is not present, enables the gyroscope to be manually uncaged in accurate position.

The sensitivity of this combination depends upon the degree of difference between the damping in the two or more parallel units, that is, the difference for the accelerations actually encountered.

The equivalent of two one-directional races at right angles to each other, may be used, such as a single spherical level which acts in any direction. Two or more such spherical levels, differently damped, would then act in an equivalent manner. For the purpose, however, of effecting the making of an electrical circuit by coincident centering of the balls, the one directional race provides the two separate contacts which are connected when the ball is centered, whereas the ball makes but a one point contact in a spherical race.

Each level unit may be calibrated, (Fig. 3) if desired, in degrees off center, like an ordinary spirit level glass, so that the combination can be used to indicate coincident centering of all the balls, or the degree of out-of-coincidence.

Figure 6:
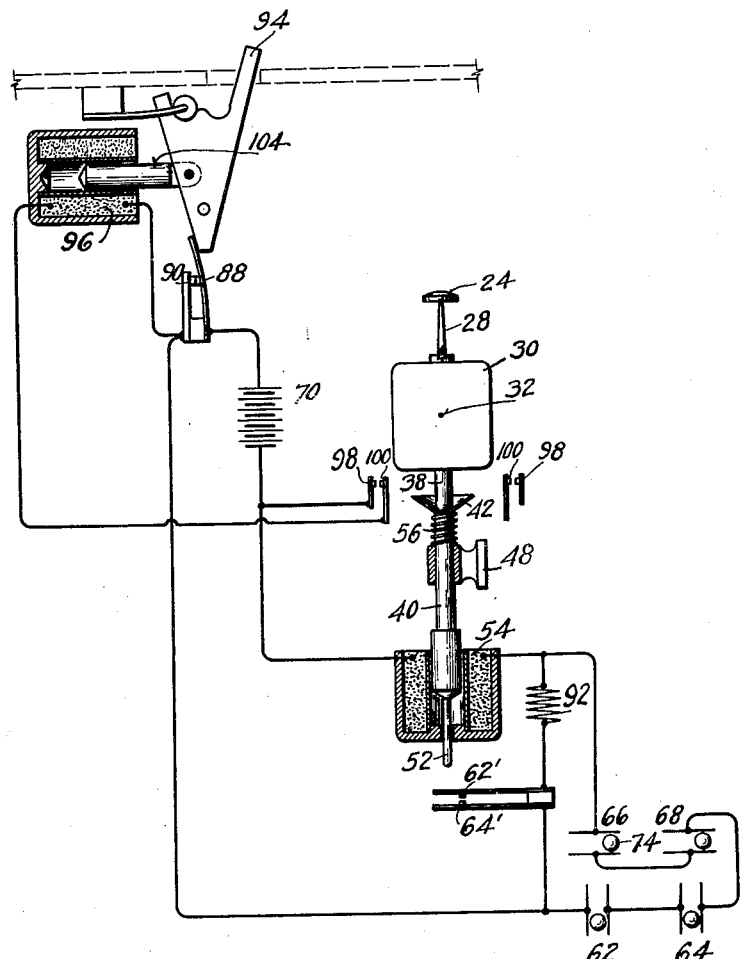
Figure 6 is the electrical diagram showing application of the level detector device to stabilization.
Figure 7:
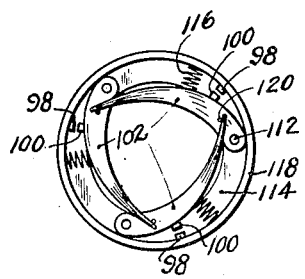
Figure 7 is a detail of the bomb sight gyroscope automatic caging device, whose electrical connections are shown in Figure 6.

The ball level detector units are diagrammatically shown, Fig. 6 as connected in series with the battery 70, main switch 88, 90 and the solenoid 54, so that when the balls 74 are all simultaneously and momentarily at centers this circuit is completed and the solenoid 54 is energized thereby unlocking the gyroscope. An auxiliary circuit comprising a resistance 92 and contacts 62, 64 are likewise connected in series with the solenoid 54, battery 70 and main switch 88, 90 so that when contacts 62, 64 are connected at the end of the plunger unlocking stroke the energizing circuit is maintained closed at a reduced current due to the resistance 92 sufficient to hold the plunger down, even though the ball circuit is opened by one or more of the balls rolling off center.

It will be seen that the electrical connecting of the several units in series so that when simultaneous centering of all deflecting elements completes an electrical circuit, constitutes a means for actuating any circuit as for automatically uncaging the gyroscope in level position.

Excessive arcing when the balls break the center contacts is prevented by virtue that the auxiliary circuit provides another path for the current. If desired, the auxiliary circuit may include means such as a relay or switch by which the ball circuit is completely disconnected after initial action, which closes the auxiliary circuit.

A control circuit is shown comprising a manual control for opening or closing the main switch 88, 90 by throwing the switch lever 94 to off or on positions, and a solenoid 96 in series connection with the main switch, the battery 70 and the bumper contacts 98, 100 so that the closing of the bumper contacts by abutting of the gyroscope pin 38 against the arms 102 in limiting swing completes the circuit which energizes solenoid 96 thereby pulling plunger 104 pivoted to the switch lever 94 and thus automatically opening the main switch. In opening the main switch, the main circuit is opened and the solenoid 54 is deenergized allowing spring 56 to force the plunger into its upper position thereby locking the gyroscope.

The bumper contact device 106 (Fig. 1) supported on a bracket 108 fixed to the casing 2 in any well-known manner such as nuts and bolts comprises a supporting ring 110 which is L-shaped in cross-section. Pivotally mounted on three equally spaced vertical pins 112 on the flange portion 114 of the supporting ring 110 are three over-lapping arms 102 which are urged inwardly by means of a light coil spring 116 interposed between each arm and the upright flange portion 118 of the supporting ring. The extent of inward movement of each arm 102 is limited by a stop pin 120 fixed at the pivotal end of each arm and sufficiently spaced from the ring to provide a clearance between each pair of contacts 98, 100 fixed on the outer edge of the arms 102 and upright flange portion 118 respectively when said arms are moved to their innermost position. It will readily be seen that when any one of the arms 102 is pushed outward by the abutting of the gyroscope pin 38 against it, the contacts 98, 100 in turn will be caused to abut, completing the circuit which opens main switch, thus deenergizing the solenoid 54 whereby the gyroscope is locked in a manner hereinafter described.

The sight case 2, Figures 1 and 2, is leveled by the operator irrespective of the attitude of the carrier craft, and he may use an ordinary spherical spirit level mounted on the case 2 as a sufficient guide by which he will, in the process of leveling the case, even by reference to an inaccurated spirit level, at some time pass the case through a level position corresponding to axis V—V in vertical. When the gyroscope axis X—X is locked into coincidence with the case axis V—V by virtue that spring 56 pushes cone 42 so as to center the gyroscope pin 38 in the cone apex, the leveling of the case 2 places the gyroscope axis X—X in vertical. When axis V—V and X—X are thus tilted into vertical and the case 2 is not being subjected to acceleration, all four balls of the detector units 62, 64, 66, 68 inclusive, reach their centers and complete the circuit through battery 70, closed main switch 88, 90 and solenoid 54; the solenoid pulls the plunger 40 and withdraws the cone 42 from the pin 38, leaving the gyroscope 30 pivotally free of the case 2 at the instant its axis X—X is vertical.

It is well understood that the means I have described for detection of level, independent of accelerations, may be modified in other ways as by constructing the ball series to break a circuit at simultaneous centering of the balls so as to energize a relay and cause the completion of an auxiliary current through the solenoid 22 or the gyroscope might be uncaged by spring and caged by energizing the solenoid.

It is also understood that any equivalent of a metallic ball rolling in a concave race may be used, such as a pivoted pendulum. If a pendulum be universally pivoted to swing in any direction, it is equivalent to two one-directional race and ball units at right angles to each other, and two such pendulums differently damped to effect non-synchronous displacements by tilt or acceleration, would be equivalent to two non-synchronous pairs of one-directional race and ball units.

I claim:—

1. A level control system for a movable body, comprising a support, a rotor bearing frame pivotally mounted therein, a rotor journaled in said frame, means for fixing said rotor frame to said support and level seeking means carried by said support for cooperating with said first-mentioned means for automatically releasing said rotor frame when said movable body is in level position.

2. A level control system for a movable body, comprising a support, level seeking means carried by said support, a rotor bearing frame universally pivotally mounted therein for precession about an axis, a rotor journaled in said frame, a mechanically actuated member for caging said rotor frame to said support, electromagnetic means, and a circuit controlled by said level means for energizing said electromagnetic means to uncage said rotor frame at a predetermined position of said support.

3. A level control system for an instrument adapted for dirigible vehicles, comprising a support for said instrument, a frame pivotally mounted therein, a rotor journaled in said frame, means for caging said rotor frame to said support, means for automatically operating said means for uncaging said frame from said support when the latter is in level position, said last-mentioned means automatically caging said frame to said support in an abnormal tilt of the support relative to said frame.

4. A device of the class described having in combination a plurality of level elements displaceable in the same direction by an acceleration or tilt of said device, means for non-synchronously retarding said elements and an electric circuit adapted to be closed by said elements when they are concurrently in normal positions corresponding to no acceleration or tilt of said device.

5. In combination with an encased gyroscope pivotally mounted about a horizontal axis, a plurality of level units, means for locking said gyroscope about said horizontal axis, each of said units comprising a member displaceable from normal position by an acceleration or tilt of said support, means for imparting different rates of damping to said displaceable members so as to effect for a given acceleration non-synchronous displacement from and to normal positions and means controlled by said displaceable members when in concurrent normal positions for releasing said locking means.

6. In combination with a gyroscope, comprising a support, a plurality of level units mounted on said support, means for fixing said gyroscope in set relation to said units, each of said units being provided with gravity controlled displaceable means and retarding means whereby a non-synchronous parallel displacement of said displaceable means is effected for a given acceleration or tilt in said units, and means controlled by said level means for releasing said gyroscope from fixed position when said displaceable means are concurrently in normal position.

7. In combination with a gyroscope, comprising a support, a plurality of pairs of level units, means for fixing said gyroscope in a position corresponding to level position of said units, each of said units being provided with a displaceable member and retarding means whereby a non-synchronous movement of said displaceable members is effected in each pair, said displaceable members in one pair being parallelly arranged and movable at right angles to the displaceable members of another pair, and means controlled by said level units for releasing said fixing means when said displaceable members are in concurrently normal positions.

8. In combination with a gyroscope, a movable support means for universally mounting said gyroscope in said support, means for caging said gyroscope to said support, means for automatically releasing said caging means when said support is in predetermined position relative to the true vertical, and auxiliary means associated with said last-mentioned means and controlled by an abnormal displacement of said gyroscope relative to said support for automatically rendering said releasing means ineffective whereby said caging means becomes effective.

9. In combination with a gyroscope, a support therefor, means for caging said gyroscope to said support, means comprising a plurality of parallelly displaceable elements, means for non-synchronously retarding said elements and an electric circuit adapted to be closed by said elements when they are concurrently in normal positions corresponding to no acceleration or tilt of said device movable for automatically releasing said caging means and auxiliary means controlled by an abnormal displacement of said gyroscope relative to said support for automatically opening said circuit to render said caging means operative.

10. In combination with a gyroscope, a support therefor, means for caging said gyroscope comprising a plunger member normally in caging position, means for releasing said caging means comprising an electro-magnet for actuating said plunger into released position, means comprising a plurality of level units for detecting a specific position of said gyroscope and for automatically energizing said electro-magnet, and auxiliary means electrically connected with said electro-magnet and controlled by an abnormal displacement of said gyroscope relative to said support for automatically rendering said caging means operative.

11. In combination with a gyroscope, a support therefor, means for caging said gyroscope relative to said support, comprising a plunger member normally in caging position, means comprising an electro-magnet for releasing said caging means, means for automatically energizing said electro-magnet when the gyroscope and support are level, and further means operated by said plunger independent of said automatic means for maintaining said gyroscope released relative to said support subsequent to the automatic uncaging.

12. In a gyroscope, a support therefor, means for caging said gyroscope including plunger member normally in caging position, a circuit comprising an electro-magnet for releasing said plunger, a plurality of movable leveling elements for detecting a specific position of said support and for closing said circuit in said specific position whereby said plunger is actuated toward released position and means actuated by said plunger for maintaining said plunger in released position.

13. In combination with a gyroscopic device for use on a moving vehicle a support, a gyroscope pivotally mounted on said support, an optical system including a reticle stabilized by said gyroscope and means for caging said gyroscope relative to said support, of means carried by said support and independent of said gyroscope for automatically uncaging said gyroscope in a predetermined position of said support relative to a horizontal plane.

14. In combination with a gyroscope pivotally mounted in a movable body, means for caging said gyroscope relative to said body, means associated with said first-mentioned means for automatically uncaging said gyroscope in a predetermined position of said body, further means controlled by said caging means for maintaining said uncaging means operative irrespective of said predetermined position and auxiliary means for recaging said gyroscope to said body when said body and gyroscope are abnormally tilted relative to each other.

15. In a sight device of the class described the combination with a gyro rotor, a journal casing for said rotor, an optical system having an optical element fixed to said casing and a support in which said journal casing is mounted for oscillation about a horizontal axis, of means cooperating with said casing for locking said casing against said oscillation and level means for unlocking said casing when said optical element is subtantially in the line of collimation of said optical system, said level means comprising a plurality of level units, each of said units having a displaceable element and retarding means, said retarding means being of different sensitivity, thereby effecting non-synchronous displacement of said elements when said elements are moved in the same direction by a given acceleration or tilt of said device.

16. In a sight device of the class described the combination with a gyro rotor, a journal casing for said rotor, a support in which said casing is mounted for oscillation about a horizontal axis and an optical system having one of its optical elements fixed to said casing, of means for locking said casing to said support and unlocking the same, said means including a plurality of level units, each of said units having a displaceable element, means for non-synchronously retarding said elements relative to one another, and an electric circuit adapted to be closed by said elements when they are concurrently in normal positions corresponding to no acceleration or tilt of said device.

17. In a gyroscopic apparatus comprising, a support, a gyroscope having two degrees of freedom relative to said support about horizontal axes, separate means controlled by tilting of said support for locking and unlocking the same about said horizontal axes, one of said means comprising an element adapted to cooperate with a part of said gyroscope to effect a locking thereof, the other of said means being operable independent of the former for actuating said caging element into released position.

18. In a gyroscopic apparatus in combination a movable system comprising a support, a gyroscope universally mounted on said support, level means carried by said support and displaceable relative thereto, means for normally locking said gyroscope to said support, and means controlled by said level means when in a predetermined position for rendering said locking means inoperative to release said gyroscope.

19. In a gyroscopic apparatus in combination a movable system comprising a support, a gyroscope universally mounted on said support, coacting optical elements connected respectively to the support and the gyroscope, level means carried by said support and displaceable relative thereto, means for normally locking said gyroscope to said support, and means controlled by said level means when in a predetermined position for rendering said locking means inoperative to release said gyroscope.

20. In a sight device of the class described, in combination with a gyro rotor a journal casing for said rotor, an optical system having optical elements fixed respectively to said casing and the support in which said journal casing is mounted for oscillation about said horizontal axis, of means cooperating with said casing for normally locking said casing against such oscillation, level means carried by said support and means controlled by said level means for rendering said locking means inoperative to unlock said casing when the optical element on said casing is substantially in the line of collimation of said optical system.

21. In a level indicator device of the class described having a plurality of level units arranged in pairs and connected in electrical series circuit, each level of a pair being provided with a gravity displaceable member constituting a movable circuit closer and also provided with retarding means having a sensitivity different from the other of said pair whereby said displaceable members in each pair are non-synchronously displaced for a given acceleration or tilt, one of said pairs being disposed at an angle to the other so that said displaceable members in one pair are movable at an angle to the displaceable members of another pair whereby a level is indicated by the closing of said circuit when all of said displaceable members are concurrently in normal position corresponding to no acceleration or tilt.

22. In a gyroscopic apparatus comprising, a support, a gyroscope having a normally vertical spin axis and two degrees of freedom mounted on said support, means for caging said gyroscope to said support, means for moving said caging means to inoperative position, and means on said support and controlled by said gyroscope when in an abnormal position for rendering said moving means ineffective whereby the caging means may become effective.

23. A level control system for an instrument adapted for dirigible vehicles, comprising a support for said instrument, a frame pivotally mounted therein, a gyro rotor having a normally vertical spin axis journaled in said frame, means for caging said rotor frame to said support, and electrical means for automatically uncaging said frame from said support including a solenoid associated with said caging means and movable contact members in the circuit thereof, the movements of which are controlled by gravity as the support oscillates for energizing said solenoid in a predetermined position of said support, and separate electrical means associated with said solenoid and controlled by said rotor when tilted abnormally relative to said support for opening the solenoid circuit whereby said caging means is rendered effective.

HENRY B. INGLIS.